United States Patent [19]

Harlan

[11] Patent Number: 4,599,643
[45] Date of Patent: Jul. 8, 1986

[54] APPARATUS RESPONSIVE TO PLURAL COLOR VIDEO SIGNALS FOR AMPLITUDE LIMITING THE VIDEO SIGNALS TO ASSIST BEAM CURRENT LIMITING

[75] Inventor: Wayne E. Harlan, Indianapolis, Ind.

[73] Assignee: RCA Corporation, Princeton, N.J.

[21] Appl. No.: 566,904

[22] Filed: Dec. 29, 1983

[51] Int. Cl.$^4$ ................. H04N 9/20; H04N 9/16
[52] U.S. Cl. ........................... 358/74; 358/65
[58] Field of Search ............... 358/65, 74, 243

[56] References Cited

U.S. PATENT DOCUMENTS

| | | | |
|---|---|---|---|
| 3,009,989 | 11/1961 | Ahrons et al. | 358/169 |
| 3,914,545 | 10/1975 | Engel | 358/243 |
| 3,928,867 | 12/1975 | Lynch | 358/39 |
| 4,096,517 | 6/1978 | Hinn | 358/40 |
| 4,167,025 | 9/1979 | Willis | 358/243 |
| 4,253,110 | 2/1981 | Harwood et al. | 358/74 |
| 4,298,885 | 11/1981 | Okada | 358/39 |
| 4,298,886 | 11/1981 | Perkins | 358/74 |
| 4,451,849 | 5/1984 | Fuhrer | 358/169 |
| 4,516,152 | 5/1985 | Willis | 358/74 |

FOREIGN PATENT DOCUMENTS 1462091 12/1968 Fed. Rep. of Germany .
3134368 3/1983 Fed. Rep. of Germany .
493178 8/1970 Switzerland .

OTHER PUBLICATIONS

Technical Bulletin, "Digit 2000 VLSI Digital TV System" ITT Semiconductor Division, pp. 3-6 and 3-7, Publication Order-No. 6251-190-3E, Apr. 1983.

Primary Examiner—James J. Groody
Assistant Examiner—Randall S. Svihla
Attorney, Agent, or Firm—P. J. Rasmussen; P. M. Emanuel; R. H. Kurdyla

[57] ABSTRACT

Excessive peak beam currents conducted by a kinescope in a color television receiver are limited by apparatus which compares the combined instantaneous magnitudes of plural color signals with a fixed threshold and, if exceeding the threshold, the combined signal is detected. The detected signal is used to limit the magnitudes of the color signals, thereby limiting excessive kinescope beam currents otherwise developed in response to the color signals. The apparatus is used in the receiver together with a more conventional automatic kinescope beam current limiter of the type which operates in conjunction with a kinescope resupply current source.

2 Claims, 1 Drawing Figure

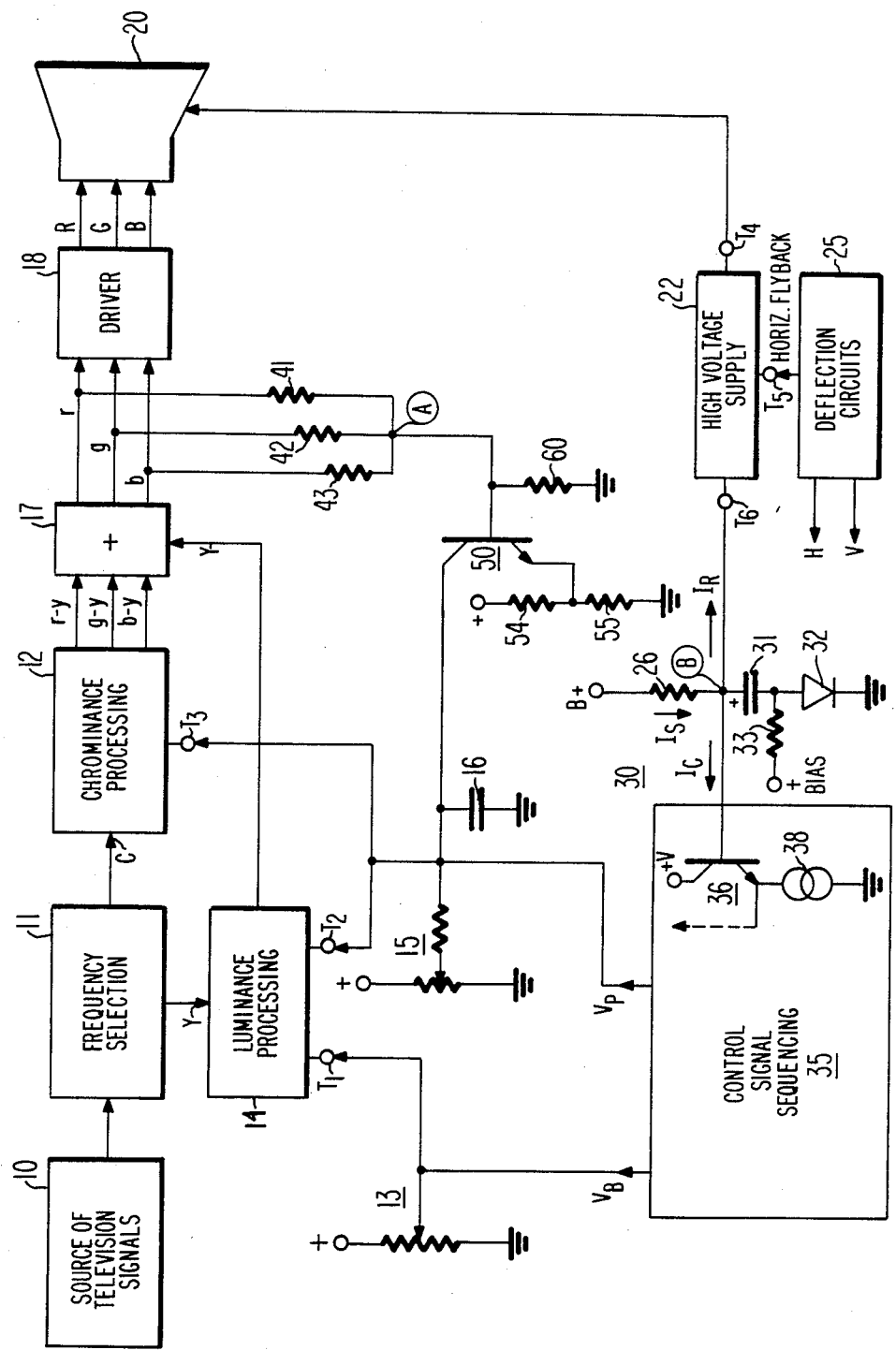

APPARATUS RESPONSIVE TO PLURAL COLOR VIDEO SIGNALS FOR AMPLITUDE LIMITING THE VIDEO SIGNALS TO ASSIST BEAM CURRENT LIMITING

This invention concerns apparatus for automatically limiting excessive beam currents conducted by an image display device such as a kinescope in a television receiver or equivalent video signal processing and display system.

Excessive beam currents conducted by an image reproducing kinescope in a television receiver can result in a degraded image display. Specifically, excess beam currents can degrade the performance of the receiver deflection system which is operatively associated with the kinescope, and can cause electron beam spot defocussing and picture blooming. High beam currents can also exceed the safe operating current capability of the kinescope, possibly damaging the kinescope and associated circuit components which may be sensitive to high beam current levels.

Various arrangements for automatically controlling both excessive average and peak beam currents are known. One such arrangement is described in U.S. Pat. No. 4,167,025—Willis. In that arrangement, as well as in other known automatic beam current limiter arrangements, a signal representative of the magnitude of the kinescope beam current is derived from the kinescope high voltage resupply system of the receiver. The beam current limiter responds to such signal when it exceeds a threshold level indicating the presence of excessively high kinescope beam current levels as manifested by the kinescope resupply current.

Beam current limiters of the type which operate in conjunction with the kinescope resupply system, as mentioned above, do not respond instantaneously to an excessive beam current condition due to delays inherent in the kinescope resupply system. For example, the kinescope anode capacitance can be discharged greatly in response to video signals representative of very bright or peak white scenes. The kinescope capacitance is eventually recharged via the high voltage resupply system, but with a delay associated with the value of the kinescope capacitance and the effective charging impedance of the resupply system, among other factors. This delay is often approximately 20 milliseconds.

It is herein recognized as desirable to limit excessive kinescope beam currents by means of apparatus which operates independent of the kinescope resupply system. In accordance with the principles of the present invention, there is disclosed apparatus in a color video signal processing system for deriving a combined signal representative of the combined instantaneous magnitudes of plural color image signals intended to be applied to an image display device. The combined signal is afterwards compared to a fixed threshold level and, if exceeding the threshold level, the compared combined signal is detected. The detected signal is used to limit the magnitude of color signals applied to the display device.

In accordance with a feature of the invention, the detected signal is provided by means of a circuit having a time constant which is long relative to the video signal line deflection internal, but short relative to the video signal field deflection internal.

In accordance with a further feature of the invention, limiting of excessive beam currents is assisted by means of a beam limiter control network operatively associated with the high voltage resupply system for the image display device.

The single FIGURE of the drawing shows a portion of a color television receiver, partly in block form and partly in schematic circuit form, including apparatus in accordance with the principles of the present invention.

A composite color television signal from a source 10 is applied to a frequency selection network 11 which provides separated luminance (Y) and chrominance (C) components of the television signal at respective outputs. A chrominance processor 12 derives plural color difference signals r-y, g-y and b-y from the separated chrominance component. The separated luminance component is processed by a luminance processor 14 which includes DC level shifting, amplifying and gain control circuits, for example. The wiper of a manual, viewer adjustable brightness control potentiometer 13 is coupled via a terminal $T_1$ to a luminance signal DC level control input of processor 14. The DC level of the luminance signal and the brightness of a displayed image vary in accordance with the level of the voltage applied to terminal $T_1$. The wiper of a manual, viewer adjustable picture control 15 is coupled via a terminal $T_2$ to a luminance signal gain control input of processor 14, and via a terminal $T_3$ to a chrominance signal gain control input of chrominance processor 12. The gains of the luminance and chrominance signals and thereby the contrast of a displayed image vary in accordance with the level of the voltage applied to terminals $T_2$ and $T_3$.

Processed luminance signals from processor 14 are combined with the color difference signals from processor 12 in a matrix amplifier 17 for producing low level color image representative signals r, g and b. These signals are applied to respective kinescope driver amplifiers in a driver stage 18 for producing high level video output signals R, G, B suitable for driving the intensity control electrodes, e.g., cathode electrodes, of a color image displaying kinescope 20. The driver amplifiers in stage 18 illustratively comprise feedback cascode driver amplifiers of the type shown, for example, in U.S. Pat. No. 4,096,517, and in my copending U.S. patent application Ser. No. 547,325 titled "Driver Amplifier for an Image Display Device filed Oct. 31, 1983 and now U.S. Pat. No. 4,577,234."

A high operating voltage for the ultor (anode) electrode of kinescope 20 is provided from an output terminal $T_4$ of a high voltage supply network 22 which includes a high voltage multiplier. Horizontal flyback pulses from receiver deflection circuits 25 are applied to network 22 via a terminal $T_5$, and kinescope resupply current ($I_R$) from a current source comprising a resistor 26 and an associated DC voltage supply (B+) is provided to network 22 via a terminal $T_6$.

Operatively associated with the kinescope resupply current source is an automatic kinescope beam current limiter network 30 comprising a filter capacitor 31, a switching diode 32, a bias resistor 33, and a beam current limiter control signal sequencing network 35. The beam current limiter responds to the magnitude of the resupply current, which is representative of the magnitude of the beam current conducted by the kinescope, for automatically limiting both excessive peak and average kinescope beam currents as will be discussed subsequently.

Additional automatic beam current limiting is provided by means of an adjunct beam current limiter network which acts as a video signal conditioning circuit, as described immediately below.

The instantaneous magnitudes of color signals r, g and b in the signal path between matrix 17 and driver 18 are respectively sensed by means of resistors 41, 42 and 43 which are separately connected to low impedance (e.g., emitter follower) outputs of matrix 17. A combined signal representative of the sum of the instantaneous magnitudes of the r, g, b signals is developed at a summing node A. The combined signal at node A is not subject to filtering since filtering of the combined signal can distort the information content of the combined signal, e.g., with respect to high frequency information associated with small, bright image areas. The combined signal is applied to the base input of a normally non-conductive comparator transistor 50. A resistor 60 forms a voltage divider with resistors 41-43 for attenuating by a given amount the combined signal at the base electrode of transistor 50. The threshold conduction level of transistor 50 is established by means of a bias voltage applied to the emitter of transistor 50 from a voltage divider comprising resistors 54 and 55. When conductive, transistor 50 provides a collector output signal which is representative of the instantaneous magnitude of the combined signal at node A above the threshold level. The collector output signal is detected by means of an integrating capacitor 16. Capacitor 16 is otherwise provided for filtering the picture control voltage developed at the wiper of potentiometer 15, e.g., for filtering noise, power supply ripple components and horizontal rate interference developed by the deflection circuits. The voltage across capacitor 16 is modified in accordance with the conduction of transistor 50 such that a resulting voltage applied to the gain control inputs of luminance processor 14 and chrominance processor 12 reduces the magnitudes of the color signals which are ultimately applied to the kinescope, thereby reducing kinescope beam current by closed loop feedback action.

The threshold conduction level of comparator transistor 50 is established so that transistor 50 conducts when the magnitude of the combined signal at node A is representative of video signals of a magnitude exceeding approximately two-thirds of a maximum white (100 IRE) video signal level. At such time the conduction level of transistor 50 is related to the magnitude of the combined signal at node A. The collector output signal from transistor 50 is detected by capacitor 16 such that the charge on capacitor 16 is reduced by an amount proportional to the collector signal level. The reduced voltage on capacitor 16 causes a related change in the voltage applied to the gain control inputs of processors 14 and 12 for limiting the magnitudes of the r, g, b signals and corresponding kinescope current.

The signal conditioning circuit exhibits a time constant, e.g., 3 or 4 milliseconds, which is preferably long relative to the horizontal line scanning interval, but short relative to the vertical field scanning interval. The time constant is a function of the emitter impedance of transistor 50, the value of filter capacitor 16, and the control loop gain of the signal conditioning circuit. The time constant of the signal conditioning circuit introduces a slight delay between the onset of a large video signal condition and the gain reduction of the video signal so as to reduce the likelihood of unwanted visible artifacts being displayed, such as including a vertical image peaking effect (i.e., image contrast transients) which may occur if the video signal gain reduction is instantaneous. On the other hand, if the time constant is too slow an associated greater delay may result in overload of the deflection circuits which are associated with the kinescope beam current resupply system as will be discussed.

The effect of the signal conditioning circuit to reduce excessive kinescope beam currents supplements the operation of beam current limiter circuit 30, which exhibits both peak and average beam current limiting modes of operation.

For purposes of average beam current limiting, average responding filter capacitor 31 is coupled between a node B and ground via diode 32, which is maintained conductive by means of bias provided via resistor 33. A voltage developed across capacitor 31 at node B varies in accordance with the level of average beam current conducted by the kinescope.

A source current $I_s$ conducted by resistor 26 of the kinescope resupply system comprises a control current component $I_c$ which flows to the input of sequencing circuit 35, and a resupply current component $I_R$ which flows to the input of high voltage supply 22. Resupply current $I_R$ varies in magnitude in accordance with the beam current conducted by the kinescope. In the normal, non-beam limiting mode, the voltage developed at node B is sufficiently large to forward bias the base-collector junction of an input emitter-follower-connected transistor 36 of network 35, whereby control current $I_c$ flows from the base to the collector of transistor 36. The forward biased base-collector junction acts as a voltage clamp with respect to node B. The collector current of transistor 36 corresponds to current $I_c$, and the emitter current of transistor 36 is supplied by a current source 38. No beam limiting control action is produced as long as the base-collector junction of transistor 36 is forward biased, during which time node B is clamped to a voltage approximately 0.7 volts greater than the collector bias voltage (+V) of transistor 36. Also at this time, transistor 36 operates non-linearly with respect to variations of current $I_c$, whereby the emitter current and voltage of transistor 36 remain substantially unchanged as a function of base current.

Automatic beam current limiting action commences when resupply current $I_R$ increases to the point where current $I_c$ diminishes to a level on the order of a few microamperes. When this occurs, the base-collector junction of transistor 36 becomes reverse biased, whereby node B is unclamped and exhibits a voltage which decreases with increasing resupply current $I_R$. Transistor 36 then operates linearly to produce an emitter control voltage which varies proportionally with variations of resupply current $I_R$ and the corresponding voltage at node B.

The emitter control votage of transistor 36 is utilized to develop variable beam limiting control voltages $V_P$ and $V_B$ at the output of network 35. Specifically, variable control voltage $V_P$ is developed when excessive beam currents occur throughout a first range, in which case voltage $V_P$ serves to limit such excessive beam currents by reducing the amplitudes of the luminance and chrominance signals via gain control inputs $T_2$ and $T_3$ of luminance processor 14 and chrominance processor 12. Control voltage $V_B$ is developed in response to excessive beam currents throughout a second range having a magnitude greater than the magnitude of beam currents within the first range. In such case the picture gain control beam current limiting action is supplemented by reducing the DC level of the video signal (i.e., reducing image brightness) via control voltage $V_B$ and terminal $T_1$ of luminance processor 14. A sequentially operating beam current limiter of this type is described in U.S. Pat. No. 4,253,110 of L. A. Harwood et al., and is also discussed in U.S. Pat. No. 4,451,849 of J. S. Fuhrer filed June 23, 1982 and titled "Plural Operating Mode Ambient Light Responsive Television Picture Control."

In the presence of excessive transient peak kinescope beam current conditions a transient, negative-going voltage developed at node B is coupled through capacitor 31 to diode 32, rendering diode 32 non-conductive and thereby decoupling capacitor 31. Changes in peak beam resupply currents are then sensed directly (i.e., without filtering) by network 35 and are controlled via the control voltage outputs from network 35 in the manner previously discussed. The peak beam current limiting operation of network 30 is described in greater detail in U.S. Pat. No. 4,167,025—Willis.

The signal conditioning circuit including summing resistors 41-43, comparator transistor 50 and detector 16 serves to reduce the likelihood of the kinescope being damaged by excessive beam currents, and also reduces the likelihood of the kinescope resupply system, including elements 22 and 25, from being overloaded in response to excessive currents conducted by the kinescope. The resupply system can be modeled as a high voltage source in series with a high impedance and which is switched at the horizontal line rate in response to horizontal flyback pulses provided by the deflection circuits. The resupply system exhibits a delay on the order of 20 milliseconds due to a time constant determined by the high impedance of the resupply system and the capacitance of the kinescope anode which is being recharged, among other factors. Excessive peak beam currents on the order of 5-6 milliamperes, which are capable of being produced in receivers with low output impedance feedback kinescope driver amplifiers, for example, can disrupt the operation of the resupply system. In particular, transformers (e.g., a chopper transformer) in the horizontal deflection circuits can be caused to saturate in the presence of such high peak beam currents. Excessive average beam currents are less troublesome for the resupply system since maximum expected average beam currents are typically significantly lower in magnitude than maximum expected peak beam currents.

The signal conditioning circuit comprising resistors 41-43, comparator transistor 50 and peak detector capacitor 16 advantageously cooperates with beam limiter network 30 when operating in a beam current limiting mode, to limit the magnitude of beam currents conducted by the kinescope. The signal conditioning circuit senses the color video signals directly for instantaneously limiting the magnitudes of video drive signals, except for the prescribed 3 millisecond output delay as discussed. Any additional peak beam currents, such as may occur during the 3 millisecond delay interval associated with the operation of the signal conditioning circuit, are subject to being limited by the action of network 30 in the peak beam current limiting mode if such additional peak beam currents are of sufficient magnitude. The use of the signal conditioning circuit to limit peak beam currents avoids the delays associated with the kinescope resupply system with which beam limiter network 30 is associated.

The signal conditioning network is preferably DC coupled to the video signal path, e.g., between the output of matrix network 17 and the gain control inputs of luminance processor 14 and chrominance processor 12, and controls the video signal amplitude substantially without affecting the video signal DC level to avoid transient image brightness changes as the video signal peak-to-peak amplitude is controlled.

The signal conditioning network also is preferably coupled to a low level video signal path, rather than to a high level video signal path such as between the outputs of driver 18 and the kinescope cathode electrodes. This preference is dictated by the desirability of avoiding the use of more costly larger power sensing resistors (e.g., 41-43) which exhibit increased parasitic capacitance, and to minimize the likelihood of signal loading effects and parasitic bandwidth limiting effects. The latter two effects can readily occur in the case of sensing video signals in the signal path from the output driver stage to the kinescope cathodes.

Sensing the plural r, g and b color signals rather than sensing only the luminance signal component provides a more accurate indication of the presence of excessive peak currents. In this regard it is noted that excessive beam currents can be generated in response to a yellow (r+g) color signal, a cyan (b+g) color signal, a magenta (r+b) color signal, or a combination of these color signals, even when the level of the luminance signal is below the threshold of comparator transistor 50. Thus sensing only the luminance component may result in the signal conditioning circuit remaining inoperative when excessive beam currents resulting from color information are present.

What is claimed is:

1. In a system for processing and displaying color video signal image information, apparatus comprising:
   a source of plural color video signals;
   a current-conducting color image display device;
   a supply network including a source of high voltage coupled to said image display device for providing a high operating voltage and resupply current to said image display device;
   a display device beam current limiter network coupled to said supply network and to said source of video signals, said beam current limiter network being responsive to the magnitude of resupply current representative of beam currents conducted by said image display device for providing a first control signal representative of the magnitude of said representative resupply current above a threshold level;
   means for coupling said first control signal to said signal source for limiting the magnitudes of said plural color signals from said source in accordance with the magnitude of said first control signal;
   plural color signal output paths associated with respective outputs of said source of plural color signals;
   a video output signal display driver stage for providing plural amplified color signals suitable for driving signal inputs of said display device in response to plural color signals received as inputs from said plural signal output paths;
   combining means for providing a combined signal representative of the sum of the instantaneous magnitudes of said plural color signals from said source;
   means for comparing said combined signal with a substantially fixed threshold reference level to provide an ouput signal·representative of said combined signal when said combined signal exceeds said threshold level in a white image direction;

means for detecting said representative output signal to provide a second control signal; and means for coupling said second control signal to said signal source for limiting the magnitudes of said plural color signals from said source in accordance with the magnitude of said second control signal.

2. Apparatus according to claim 1, wherein
said combining means is coupled to said plural color signal output paths for providing a combined signal representative of the sum of the instantaneous magnitudes of plural color signals conveyed by said plural color signal output paths.

* * * * *